US012517015B2

(12) United States Patent
Bellis

(10) Patent No.: US 12,517,015 B2
(45) Date of Patent: Jan. 6, 2026

(54) METHOD FOR DETECTING BURNER FAILURE

(71) Applicant: Rolls-Royce plc, London (GB)

(72) Inventor: Mark J E Bellis, Derby (GB)

(73) Assignee: Rolls-Royce PLC, London (GB)

( * ) Notice: Subject to any disclaimer, the term of this patent is extended or adjusted under 35 U.S.C. 154(b) by 36 days.

(21) Appl. No.: 18/592,725

(22) Filed: Mar. 1, 2024

(65) Prior Publication Data
US 2025/0180435 A1 Jun. 5, 2025

(30) Foreign Application Priority Data
Mar. 13, 2023 (GB) ..................... 2303645

(51) Int. Cl.
| | |
|---|---|
| F01D 21/00 | (2006.01) |
| F01D 21/12 | (2006.01) |
| F02C 9/26 | (2006.01) |
| F02C 9/28 | (2006.01) |
| G01K 1/02 | (2021.01) |
| G01M 15/14 | (2006.01) |

(52) U.S. Cl.
CPC ........... *G01M 15/14* (2013.01); *F01D 21/003* (2013.01); *F01D 21/12* (2013.01); *F02C 9/263* (2013.01); *F02C 9/28* (2013.01); *G01K 1/026* (2013.01); *F05D 2260/80* (2013.01); *F05D 2270/3032* (2013.01)

(58) Field of Classification Search
CPC .... F02C 9/28; F02C 9/26; F02C 9/263; F02C 7/262; F01D 21/003; F01D 21/12
See application file for complete search history.

(56) References Cited

U.S. PATENT DOCUMENTS

| | | |
|---|---|---|
| 3,150,709 A | 9/1964 | Bolmgren |
| 8,297,036 B2 | 10/2012 | Vanderleest et al. |
| 8,474,269 B2 | 7/2013 | Panov |
| 9,297,707 B2 | 3/2016 | Bellis et al. |

(Continued)

FOREIGN PATENT DOCUMENTS

| | | |
|---|---|---|
| EP | 3757460 B1 | 6/2022 |
| EP | 4015783 A1 | 6/2022 |

OTHER PUBLICATIONS

European search report dated Sep. 9, 2024, issued in EP Patent Application No. 24157231.2.

(Continued)

*Primary Examiner* — Thuyhang N Nguyen

(57) ABSTRACT

A method for detecting a burner failure in a gas turbine engine that has a combustor and a turbine disposed downstream of the combustor. The combustor has a plurality of burners arranged annularly. The method includes providing a plurality of temperature sensors arranged annularly at an outlet of the turbine; obtaining a plurality of temperature signals from the plurality of temperature sensors; determining a plurality of validated temperature signals from the plurality of temperature signals; determining a temperature focus at least based on the plurality of validated temperature signals; improving the temperature focus such that the temperature focus is within a tolerance range; and performing at least one hazard protection action at least when the temperature focus crosses a predetermined threshold.

20 Claims, 9 Drawing Sheets

(56) References Cited

U.S. PATENT DOCUMENTS

| | | | |
|---|---|---|---|
| 9,790,834 B2 | 10/2017 | Miller et al. | |
| 10,422,287 B2 * | 9/2019 | Jaiven | F02C 9/28 |
| 10,895,872 B2 * | 1/2021 | Fishkin | G01K 15/007 |
| 10,907,498 B2 * | 2/2021 | Asti | F23N 5/022 |
| 11,047,309 B2 * | 6/2021 | Fiedler | F02C 7/26 |
| 2002/0178730 A1 * | 12/2002 | Ganz | F01D 17/085 |
| | | | 60/773 |
| 2015/0192074 A1 * | 7/2015 | Eifert | F02C 7/236 |
| | | | 60/776 |
| 2018/0266272 A1 | 9/2018 | Asti et al. | |
| 2019/0041838 A1 | 2/2019 | Fishkin et al. | |
| 2024/0110489 A1 * | 4/2024 | Marchand | G01M 13/003 |

OTHER PUBLICATIONS

Great Britain search report dated Sep. 12, 2023 issued in GB Patent Application No. 2303645.2.

* cited by examiner

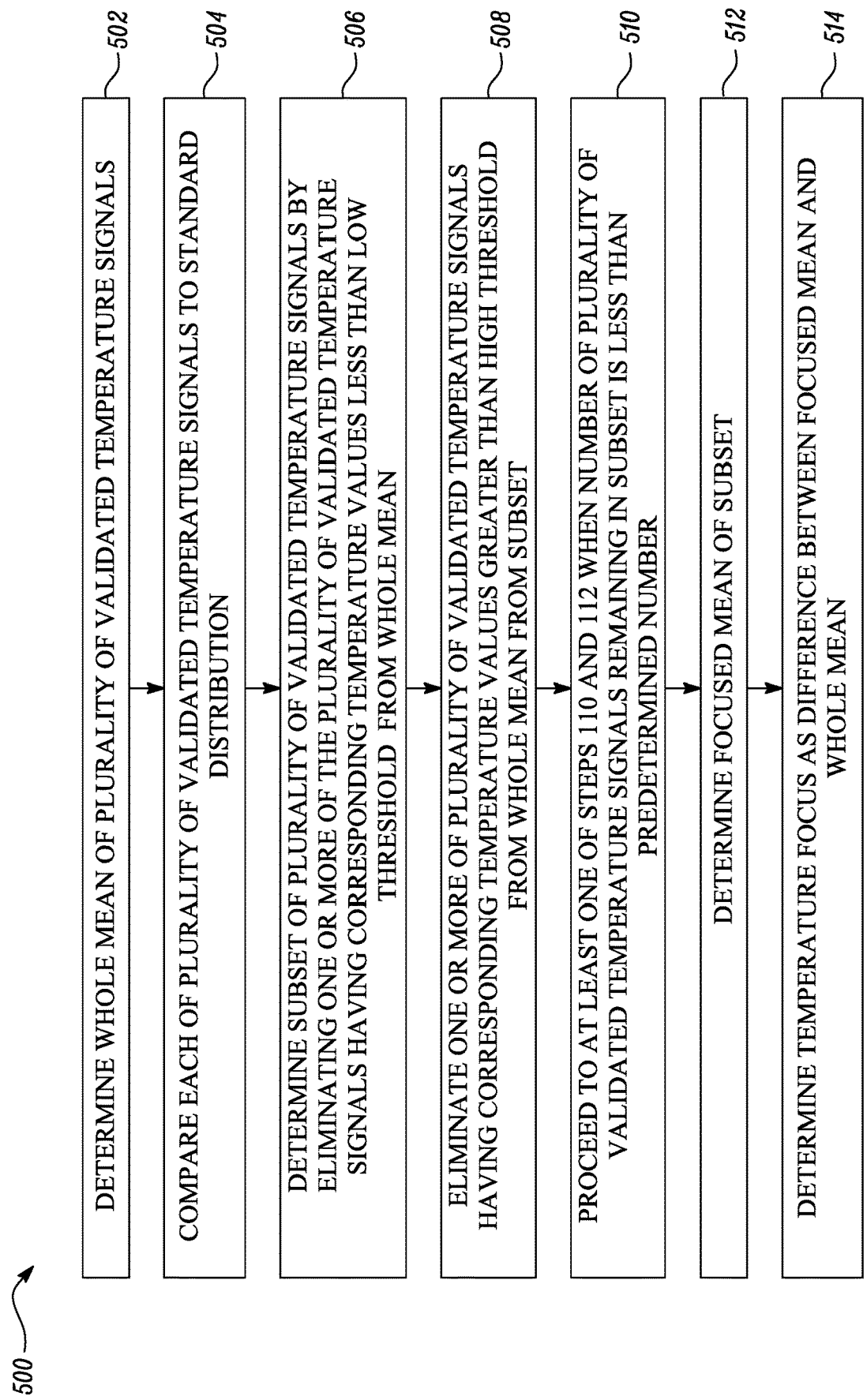

METHOD FOR DETECTING BURNER FAILURE

CROSS-REFERENCE TO RELATED APPLICATIONS

This specification is based upon and claims the benefit of priority from United Kingdom Patent Application Number GB 2303645.2 filed on Mar. 13, 2023, the entire contents of which is incorporated herein by reference.

BACKGROUND

Technical Field

The present disclosure relates to a method for detecting a burner failure in a gas turbine engine.

Description of the Related Art

During operation of a turbine system of an engine (e.g., a gas turbine engine), one or more burners of a combustor of the turbine system may fail. For example, flames of the one or more burners may unexpectedly extinguish. In some cases, a burner fault detection may be temperature-based and may be accomplished by using temperature sensors (e.g., thermocouples).

Current temperature-based burner fault detection method and systems may not be immune to a single sensor failure and therefore cause inadvertent alarms. This may also lead to unnecessary shutdowns. Further, temperature sensors, such as thermocouples, may not be the most reliable of sensors and automated hazard protection (e.g., reduction of thrust) based on temperature readings alone should be avoided. The temperature readings of the temperature sensors may further vary with swirl of the hot gases in turbines of the turbine system. The swirl may vary with the speed and acceleration of the engine.

In some cases, such methods and systems may further detect positions of burner failure. However, detecting positions of the burner failure may not be required for hazard protection. Such methods and systems may be complex and therefore may take more time to execute. This may be undesirable in a hazardous situation and may delay the hazard protection. Further, information related to the positions of the burner failure may be required for maintenance benefit only and would need a swirl calculation.

Therefore, there remains a need for a simple method of burner fault detection that is robust to multiple sensor failures and the effects of swirl of hot gases around the turbines, which may cause variability in temperature readings.

SUMMARY

According to a first aspect there is provided method for detecting a burner failure in a gas turbine engine having a combustor and a turbine disposed downstream of the combustor, the combustor having a plurality of burners arranged annularly, the method including the steps of: A) providing a plurality of temperature sensors arranged annularly at an outlet of the turbine, the plurality of temperature sensors having respective temperature ranges; B) obtaining a plurality of temperature signals from the plurality of temperature sensors; C) determining a plurality of validated temperature signals from the plurality of temperature signals, wherein the plurality of validated temperature signals is within the respective temperature ranges of the respective temperature sensors; D) determining a temperature focus at least based on the plurality of validated temperature signals; E) improving the temperature focus such that the temperature focus is within a tolerance range; and F) performing at least one hazard protection action at least when the temperature focus crosses a predetermined threshold.

The method of the present disclosure may eliminate invalid signals. The method is not solely based upon comparison of the plurality of individual temperature signals with a mean. Further, the method may be simple and may not require determining a temperature spread and/or step(s) for detecting position(s) of the burner failure. The detection of the position(s) of the burner failure may not be necessary for hazard protection. Thus, the method of the present disclosure may be robust, simple to implement, and quicker to execute.

Further, the method of the present disclosure may prevent tripping any alarm or shutdown criterion on the basis of a single temperature signal. The method may help to determine an anomaly, for example, whether a condition would become potentially-hazardous within a current flight, further performing at least one hazard protection action at least when the condition would become potentially-hazardous.

In some embodiments, steps B), C), D), and E) are cyclically repeated in time. In some embodiments, the method proceeds to at least one of steps E) and F) when the temperature focus is outside the tolerance range for a predefined number of consecutive cycles.

Therefore, if the temperature focus is outside the tolerance range for the predefined number of consecutive cycles, the method may detect an anomaly and may either improve the temperature focus or perform the at least one hazard protection action.

In some embodiments, the tolerance range for a predefined number of consecutive cycles is a standard fault integrator with a threshold from 50 to 200, an up-count from 5 to 20 per cycle of exceedance, and/or a down-count from 1 to 4 per cycle of compliance with the temperature focus threshold. For example, a set of values may be 100, 10, and 2 respectively.

In some embodiments, step C) includes the sub-steps of: C1) eliminating one or more temperature signals from the plurality of temperature signals to determine the plurality of validated temperature signals, such that the plurality of validated temperature signals are within respective temperature ranges of the respective temperature sensors; C2) determining a location of each of the plurality of respective sensors generating the plurality of validated temperature signals; and C3) selecting one validated temperature signal from each location from which two or more of the plurality of validated temperature signals are received, wherein the selection is based on at least one of a channel based selection, a temperature value based selection, a mean based selection, and a model based selection.

Therefore, the method may screen out outliers among the temperature values which may be due to a fault or a defect in the respective temperature sensors. This may help to reduce occurrence of an inadvertent trip which, in turn, may trigger an alarm, or any other hazard protection action due to the fault or the defect in the temperature sensors.

In some embodiments, the method proceeds to at least one of steps E) and F) when a number of the plurality of validated temperature signals is less than a predetermined number.

In some embodiments, the total number of temperature sensors around the turbine is from 4 to 20, for example from 6 to 12. In some embodiments for a small engine, the total number of temperature sensors around the turbine may be from 6 to 8. In some embodiments for a large engine, the total number of temperature sensors around the turbine may be from 10 to 12. In some embodiments, at least half the total number of temperature sensors provide a validated temperature signal (optionally with redundancy at each location) else reporting as "Faulty".

In some embodiments, the method proceeds to at least one of steps E) and F) when the plurality of validated temperature signals is absent in a predetermined angular range. For example, from 60 to 180 degrees.

The useful range may depend on the number of temperature sensors. In some embodiments, two adjacently placed temperature sensors failing to provide a validated temperature signal is sufficient to provide a report of "Faulty".

In some embodiments, step D) includes the sub-steps of: D1) determining a whole mean of the plurality of validated temperature signals; D2) determining a subset of the plurality of validated temperature signals by eliminating one or more of the plurality of validated temperature signals having corresponding temperature values less than a low threshold from the whole mean; D3) determining a focused mean of the subset; and D4) determining the temperature focus as a difference between the focused mean and the whole mean.

In some embodiments, the low threshold is from 20 to 100 K below, for example from 30 to 70 K below the whole mean. In some embodiments, the low threshold is approximately 50 K below the whole mean.

Therefore, the method may screen out low outliers among the temperature values. Further, if a burner is blocked then the corresponding temperature value will be a low outlier and will be eliminated. Thus, the focused mean will be higher than the whole mean. The method may therefore be designed to work with a variable number of validated temperature signals, with one or more being eliminated and restored as the validated temperature signals may vary. The method may also work with some temperature sensors having failed on a permanent basis.

In some embodiments, step D2) further includes the sub-step of: D2a) eliminating one or more of the plurality of validated temperature signals having corresponding temperature values greater than a high threshold from the whole mean from the subset.

Therefore, the method may further screen out high outliers among the temperature values. This may help to reduce occurrence of an inadvertent trip which, in turn, may trigger an alarm, or any other hazard protection action. Further, the method recognizes that high temperatures owing to multiple blocked burners may cause turbine degradation, leading to high energy debris release and may be considered as potentially-hazardous.

In some embodiments, the high threshold is from 50 to 200 K, for example from 60 to 140 K above the whole mean. In some embodiments, the high threshold is approximately 100 K above the whole mean.

In some embodiments, step D) includes the sub-steps of: D1) determining a whole mean of the plurality of validated temperature signals; D2) comparing each of the plurality of validated temperature signals to a standard distribution; D3) determining a subset of the plurality of validated temperature signals by eliminating one or more of the plurality of validated temperature signals having corresponding temperature values below a standard deviation threshold from the whole mean; D4) eliminating one or more of the plurality of validated temperature signals having corresponding temperature values above the standard deviation threshold from the whole mean from the subset; D5) determining a focused mean of the subset; and D6) determining the temperature focus as a difference between the focused mean and the whole mean.

The standard deviation threshold typically depends on the distribution and on real data from tests to show the grouping of signal values. In some embodiments, the standard deviation threshold is from 0.5 to 3, for example approximately 1 with a Normal distribution.

In some embodiments, the standard distribution is selected from at least one of Exponential distribution, Normal distribution, Lognormal distribution, Poisson distribution, and Weibull distribution.

Therefore, the method may also screen out the low and high outliers according to a shape of the standard distribution. The shape of the standard distribution may be determined and chosen based on historical data/tests.

In some embodiments, the method proceeds at least one of steps E) and F) when a number of the plurality of validated temperature signals remaining in the subset after eliminating the one or more of the plurality of validated temperature signals having the corresponding temperature values less than the low threshold is less than a predetermined number.

In some embodiments, the predetermined number is from four to eight, of which two, three, four or five should be above the low threshold to remain valid, for example the predetermined number is six, of which four should be above the low threshold to remain valid.

Such a predetermined number typically depends on how many temperature signals are valid. In some embodiments, for example, when only six temperature signals are valid the predetermined number is two, leaving four to compose the focused mean. Large engines may lose up to eight of twelve temperature signals and still have four temperature signals to compose the focused mean, whereas small engines with seven temperature signals may only lose one temperature signal before reporting as "Faulty".

In some embodiments, the method proceeds to at least one of steps E) and F) when a number of the plurality of validated temperature signals remaining in the subset after eliminating the one or more of the plurality of validated temperature signals having the corresponding temperature values greater than the high threshold is less than a predetermined number.

In some embodiments, the method proceeds to at least one of steps E) and F) when a number of the plurality of validated temperature signals remaining in the subset is less than a predetermined number.

Therefore, when the number of the plurality of validated temperature signals is insufficient or the number of the plurality of validated temperature signals that are not outliers is insufficient, the method proceeds to at least one of steps E) and F). In some cases, there may be a potential for an engine control system to prevent the dispatch of an aircraft or prohibit restarting the gas turbine engine in a land-based or marine application. In some cases, upon detecting the anomaly, further operation may be determined by evaluating risk to the gas turbine engine from the detected anomaly. Further, this may also allow dispatchability with a number of faults sufficient to provide planned maintenance, such as when the aircraft visits a main base or when a power plant or oil & gas platform is shut down for long-term maintenance.

A moderate temperature focus (i.e., a difference between the focused mean and the whole mean) may indicate that cleaning the gas turbine engine may suffice to ensure that any blocked burners are unblocked, and this may alleviate the difference between the focused mean and the whole mean. In other words, the temperature focus may be improved such that the temperature focus is within the tolerance range.

In some embodiments, step E) includes transmitting a command to a fuel staging control system to increase a fuel flow to at least one burner from the plurality of burners.

A high temperature focus may indicate that the gas turbine engine may have a limited life if it were to continue running at the same conditions. A higher temperature focus may indicate that the predicted engine life may be no more than the current mission, in which case the gas turbine engine should not be run again. However, in order to continue the current mission, there may be further accommodation, such as applying a thrust limit to the gas turbine engine. This would apply differently to the aircraft than to other applications because the total thrust provision must remain sufficient. Therefore, the thrust limit (e.g., by modifying the fuel flow) may accommodate anomalies of moderate severity.

In some embodiments, step F) includes transmitting a warning to a cockpit of an aircraft powered by the gas turbine engine.

In some embodiments, step F) further includes transmitting a command to reduce the fuel flow to a lower point within the operating range.

In some embodiments, step F) further includes transmitting a command to shut down the gas turbine engine.

Therefore, when the temperature focus is greater than the predetermined threshold, it may indicate that the predicted engine life may be less than the length of the current mission, in which case the function may warn the pilot, driver, or operator to reduce engine power straight away or to shut down the gas turbine engine straight away.

In some embodiments the predetermined threshold is from 10 to 100 K, for example from 20 to 60 K, more particularly a value of approximately 30 K.

In some embodiments, the gas turbine engine further includes a final stage turbine disposed downstream of the turbine. In some embodiments, step A) includes providing the plurality of temperature sensors upstream of the final stage turbine.

As noted elsewhere herein, the present disclosure may relate to a gas turbine engine. Such a gas turbine engine may include an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further include a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the gas turbine engine divided by the total mass flow through the gas turbine engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 9 is a flow chart for a method for determining the temperature focus in accordance with yet another embodiment of the present disclosure.

DETAILED DESCRIPTION

Aspects and embodiments of the present disclosure will now be discussed with reference to the accompanying figures. Further aspects and embodiments will be apparent to those skilled in the art.

Figure 1:
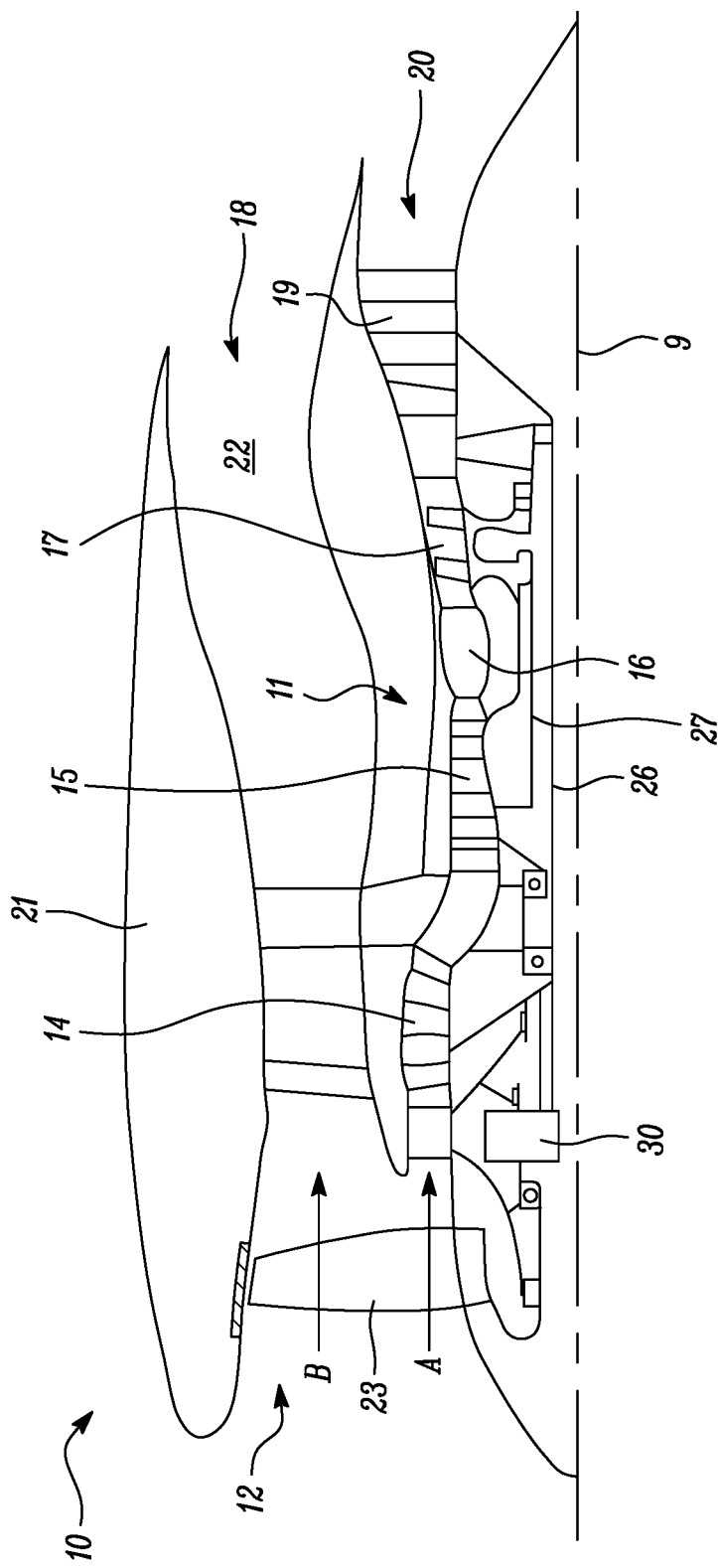
FIG. 1 is a sectional side view of a gas turbine engine.

FIG. 1 illustrates a gas turbine engine 10 having a principal rotational axis 9. The gas turbine engine 10 includes an air intake 12 and a propulsive fan 23 that generates two airflows: a core airflow A and a bypass airflow B. The gas turbine engine 10 includes an engine core 11 that receives the core airflow A. The engine core 11 includes, in axial flow series, a low-pressure compressor 14, a high-pressure compressor 15, a combustor 16, a high-pressure turbine 17, a low-pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustor 16 where it is mixed with fuel and the mixture is combusted. The resultant hot combustion products then expand through, and thereby drive, the high-pressure and low-pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low-pressure turbine" and "low-pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the gas turbine engine (i.e., not including the gearbox output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not include a gearbox 30.

The geometry of the gas turbine engine 10, and components thereof, is defined by a conventional axis system, including an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
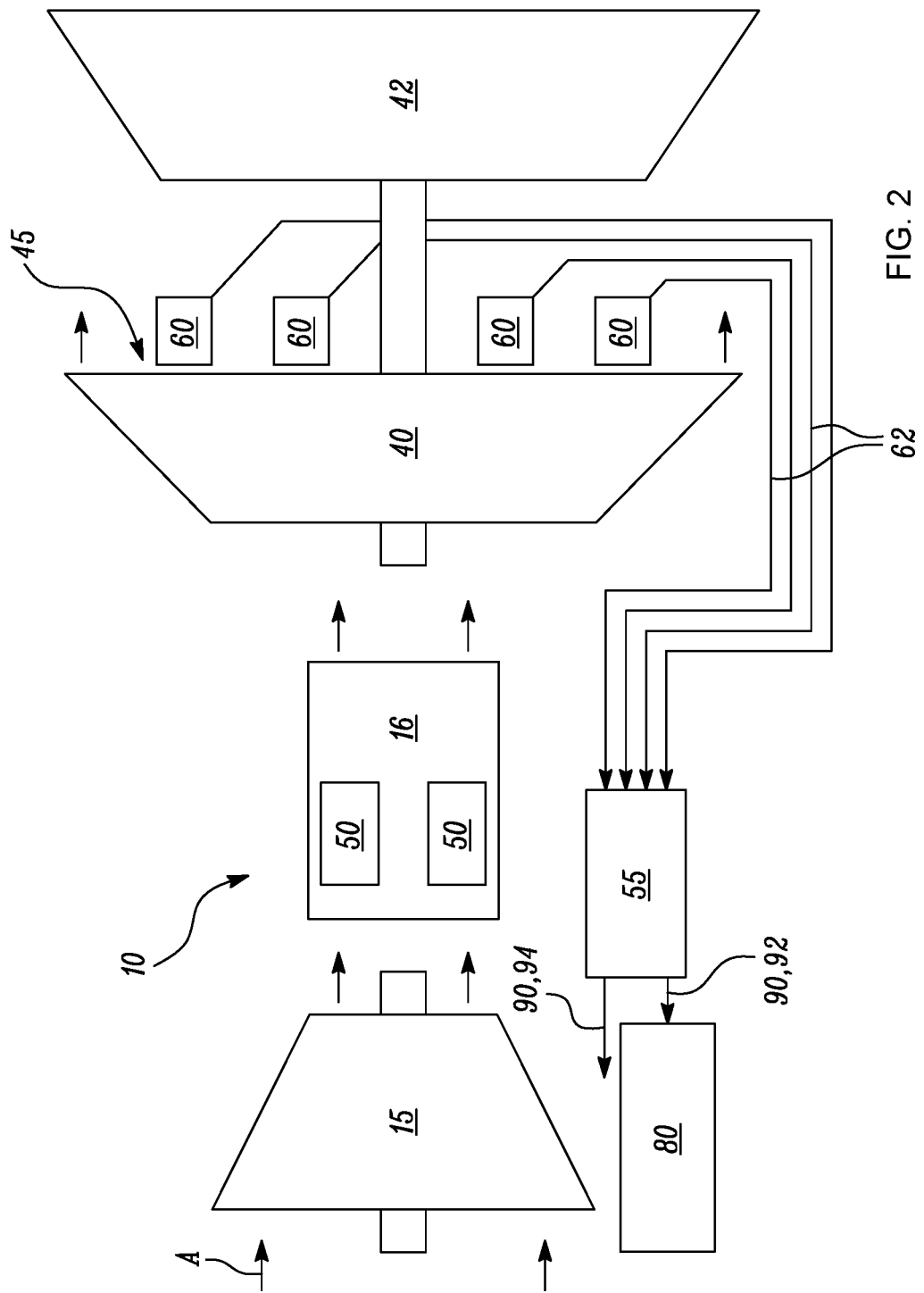
FIG. 2 is a detailed schematic exploded side view of a portion of the gas turbine engine in accordance with an embodiment of the present disclosure.

FIG. 2 illustrates a detailed schematic exploded side view of a portion of the gas turbine engine 10 in accordance with an embodiment of the present disclosure.

As discussed above, the gas turbine engine 10 incudes the combustor 16. The combustor 16 includes a plurality of burners 50. Specifically, the combustor 16 has the plurality of burners 50 arranged annularly. As illustrated in FIG. 2, the gas turbine engine 10 further incudes a turbine 40 disposed downstream of the combustor 16.

In some cases, the turbine 40 may be the high-pressure turbine 17 (shown in FIG. 1). In some cases, the turbine 40 may be the low-pressure turbine 19 (shown in FIG. 1).

The gas turbine engine 10 further includes a plurality of temperature sensors 60. Specifically, the gas turbine engine 10 further includes the plurality of temperature sensors 60 arranged annularly at an outlet 45 of the turbine 40.

In some embodiments, the gas turbine engine 10 further includes a final stage turbine 42 disposed downstream of the turbine 40. In some embodiments, the plurality of temperature sensors 60 is disposed upstream of the final stage turbine 42. The temperature sensors 60 are therefore disposed between the turbine 40 and the final stage turbine 42. In some cases, the turbine 40 may be the high-pressure turbine 17 (shown in FIG. 1) and the final stage turbine 42 may be the low-pressure turbine 19 (shown in FIG. 1).

The plurality of temperature sensors 60 is configured to generate a plurality of temperature signals 62. In some embodiments, each of the plurality of temperature sensors 60 is configured to generate one or more temperature signals 62. In the illustrated example of FIG. 2, each of the plurality of temperature sensors 60 generates one temperature signal 62. In some other examples, each of the plurality of temperature sensors 60 is configured to generate two temperature signals 62. The number of temperature signals 62 generated by a temperature sensor 60 may be based on the type of the temperature sensor 60.

The gas turbine engine 10 further incudes a controller 55. The controller 55 may be configured for detecting a burner failure in the gas turbine engine 10 (shown in FIG. 1). The controller 55 may include one or more processors and one or more memories. It should be noted that the one or more processors may embody a single microprocessor or multiple microprocessors for receiving various input signals. Numerous commercially available microprocessors may be configured to perform the functions of the one or more processors. Each processor may further include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. Each processor may include one or more components that may be operable to execute computer executable instructions or computer code that may be stored and retrieved from the one or more memories.

In some embodiments, the controller 55 is communicably coupled to each of the plurality of temperature sensors 60. The controller 55 obtains the plurality of temperature signals 62 from the plurality of temperature sensors 60.

In some embodiments, the gas turbine engine 10 further includes a fuel staging control system 80. The fuel staging control system 80 may control a fuel flow to the at least one burner 50 from the plurality of burners 50. Specifically, the fuel staging control system 80 may control the fuel flow to the at least one burner 50 from the plurality of burners 50 via a fuel staging valve (not shown). In some embodiments, the controller 55 may be configured to determine a staging state of the gas turbine engine 10 based on a state of the fuel staging valve. In some embodiments, a fuel flow sensing valve may be used to determine the staging state of the engine 10. The staging state of the gas turbine engine 10 may be determined so that the burner failure is not confused with a normal operation condition of the turbine system during which one or more burners 50 may be purposely inactive.

Figure 3:
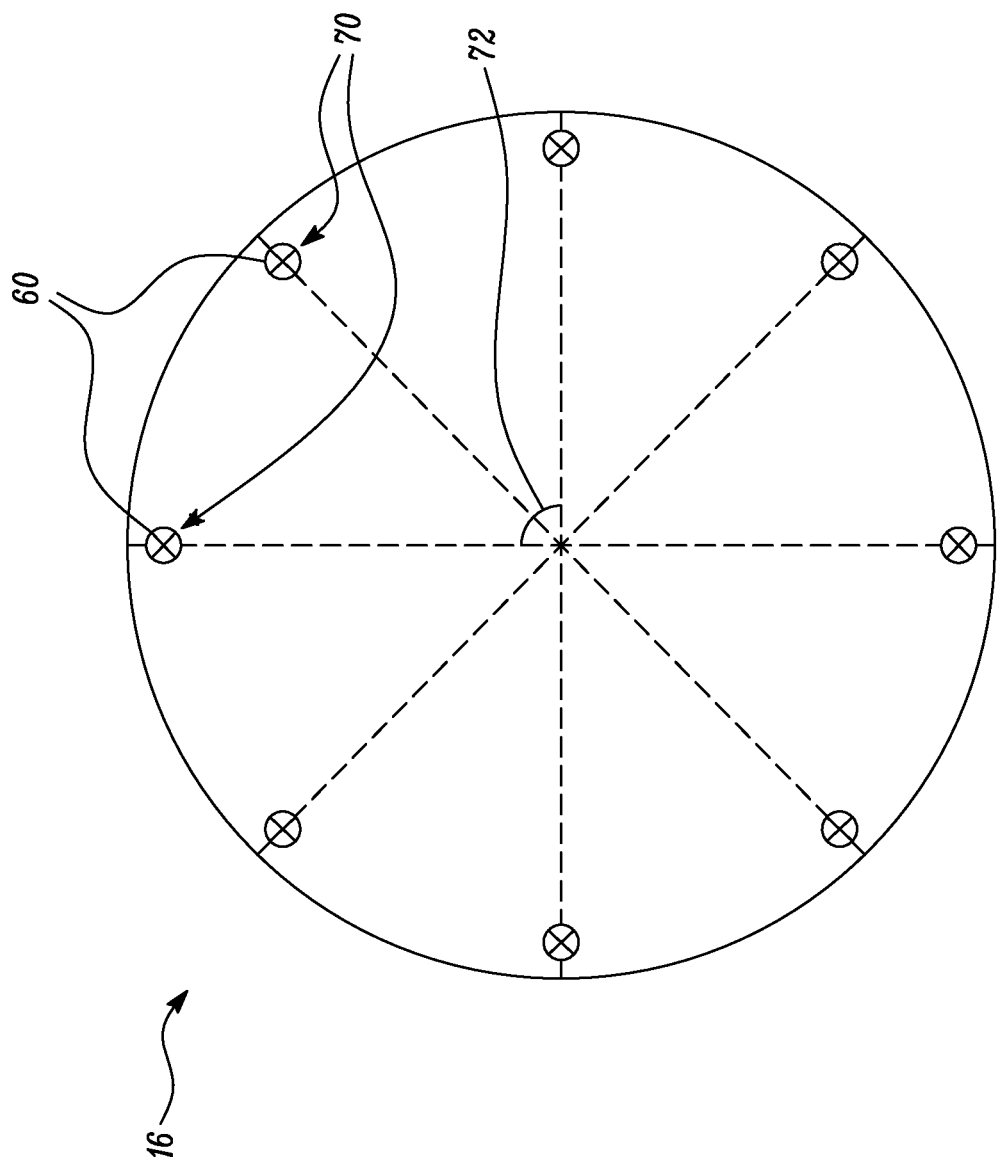
FIG. 3 is a schematic front view of a combustor of the gas turbine engine in accordance with an embodiment of the present disclosure.

FIG. 3 illustrates a schematic front view of the combustor 16 of the gas turbine engine 10 shown in FIG. 1 in accordance with an embodiment of the present disclosure.

As illustrated in FIG. 3, the plurality of temperature sensors 60 is arranged annularly at respective locations 70. In the illustrated embodiment of FIG. 3, the plurality of temperature sensors 60 includes 8 temperature sensors. In some embodiments, the plurality of temperature sensors 60 may include 4, 6, 7, 8, 9, 10, 11, 12, 14, 16, or 18 temperature sensors. The plurality of temperature sensors 60 may include any number of temperature sensors 60, as per desired application attributes.

Further, in the illustrated embodiment of FIG. 3, the plurality of temperature sensors 60 arranged annularly at respective locations 70 is substantially equally angularly spaced apart from each other. However, in some other embodiments, the plurality of temperature sensors 60 arranged annularly at respective locations 70 may not be equally angularly spaced apart from each other.

Figure 4A:
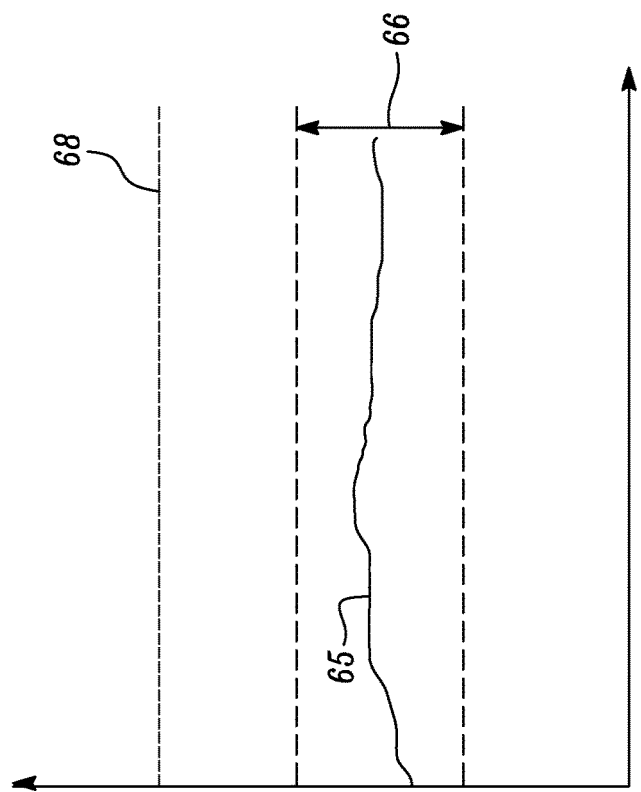
FIG. 4A is a graph depicting a plurality of temperature signals in accordance with an embodiment of the present disclosure.

FIG. 4A illustrates a graph depicting the plurality of temperature signals 62 in accordance with an embodiment of the present disclosure. Specifically, the graph depicts a plot of temperature signals versus time.

Referring to FIGS. 1 to 4A, the plurality of temperature sensors 60 has respective temperature ranges 63. In some embodiments, the plurality of temperature sensors 60 may have similar respective temperature ranges 63. However, in some other embodiments, the plurality of temperature sensors 60 may have different respective temperature ranges 63. The temperature ranges 63 of the temperature sensors 60 may be based on the type of the temperature sensors 60.

The controller 55 may be configured to determine a plurality of validated temperature signals 64 from the plurality of temperature signals 62. The plurality of validated temperature signals 64 is within the respective temperature ranges 63 of the respective temperature sensors 60.

In some embodiments, the controller 55 may eliminate one or more temperature signals 62 from the plurality of temperature signals 62 to determine the plurality of validated temperature signals 64, such that the plurality of validated temperature signals 64 is within respective temperature ranges 63 of the respective temperature sensors 60.

Therefore, the controller 55 may screen out outliers among the temperature values which may be due to a fault or a defect in the respective temperature sensors 60. This may help to reduce occurrence of an inadvertent trip which, in turn, may trigger an alarm, or any other hazard protection action due to the fault or the defect in the temperature sensors 60.

In some embodiments, the controller 55 may further determine the location 70 (shown in FIG. 3) of each of the plurality of respective sensors 60 generating the plurality of validated temperature signals 64.

In some embodiments, the controller 55 may further select one validated temperature signal 64 from each location 70 from which two or more of the plurality of validated temperature signals 64 are received. In some embodiments, the selection is based on at least one of a channel based selection, a temperature value based selection, a mean based selection, and a model based selection.

In some embodiments, the controller 55 may be a dual channel controller. In some cases, each of the plurality of temperature sensors 60 may be connected to both channels of the controller 55. In some cases, one channel from the dual channels may have a higher priority. The one validated temperature signal 64 from that channel may then be selected by the controller 55. In some embodiments, the controller 55 may be configured to select the one validated temperature signal 64 having a higher temperature value. In some other embodiments, the controller 55 may be configured to select the one validated temperature signal 64 having a lower temperature value. In some embodiments, the controller 55 may be configured to select a mean of the two or more of the plurality of validated temperature signals 64 that are received. In some embodiments, the controller 55 may be configured to select the one validated temperature signal 64 closer to a model value or a model distribution. In some embodiments, the model may be a standard distribution.

Figure 4B:
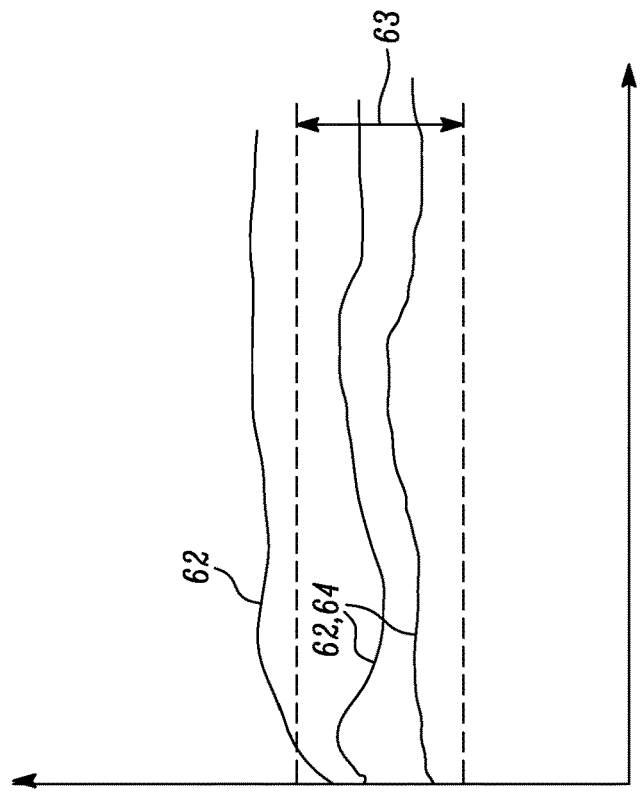
FIG. 4B is a graph depicting a temperature focus in accordance with an embodiment of the present disclosure.

FIG. 4B illustrates a graph depicting a temperature focus 65 in accordance with an embodiment of the present disclosure. Specifically, the graph depicts a plot of temperature focus versus time.

Referring to FIGS. 1 to 4B, the controller 55 may be configured to determine the temperature focus 65 at least based on the plurality of validated temperature signals 64.

Further, the controller 55 may be configured to improve the temperature focus 65 such that the temperature focus 65 is within a tolerance range 66. This can involve, for example, eliminating outliers and/or smoothing the validated temperature signals. A moderate temperature focus 65 may indicate that cleaning the gas turbine engine may suffice to ensure that any blocked burners 50 are unblocked, and this may alleviate the difference between the focused mean and the whole mean. In other words, the temperature focus 65 may be improved such that the temperature focus 65 is within the tolerance range 66.

In some embodiments, the controller 55 may be configured to transmit a command 92. In some embodiments, the controller 55 may be configured to transmit the command 92 to the fuel staging control system 80 to increase the fuel flow to at least one burner 50 from the plurality of burners 50 to improve the temperature focus 65 such that the temperature focus 65 is within the tolerance range 66.

A high temperature focus 65 may indicate that the gas turbine engine 10 may have a limited life if it were to continue running at the same conditions. A higher temperature focus 65 may indicate that the predicted engine life may be no more than the current mission, in which case the gas turbine engine 10 should not be run again. However, in order to continue the current mission, there may be further accommodation, such as applying a thrust limit to the gas turbine engine 10. This would apply differently to the aircraft than to other applications because the total thrust provision must remain sufficient. Therefore, the thrust limit (e.g., by modifying the fuel flow) may accommodate anomalies of moderate severity.

Furthermore, the controller 55 may be configured to perform at least one hazard protection action 90 at least when the temperature focus 65 crosses a predetermined threshold 68. In some embodiments, the at least one hazard protection action 90 may include transmitting a warning 94 to a cockpit of an aircraft powered by the gas turbine engine 10. In some embodiments, the at least one hazard protection action 90 may include transmitting the command 92 to reduce the fuel flow to a lower point within the operating range. In some embodiments, the at least one hazard protection action 90 may include transmitting the command 92 to shut down the gas turbine engine 10.

Therefore, when the temperature focus 65 is greater than the predetermined threshold 68, it may indicate that the predicted engine life may be less than the length of the current mission, in which case the function may warn the pilot, driver, or operator to reduce engine power straight away or to shut down the gas turbine engine 10 straight away.

In some embodiments, when a number of the plurality of validated temperature signals 64 is less than a predetermined number, the controller 55 may improve the temperature focus 65 such that the temperature focus 65 is within the tolerance range 66. In some embodiments, when the number of the plurality of validated temperature signals 64 is less than the predetermined number, the controller 55 may perform the at least one hazard protection action 90. In some embodiments, the predetermined number may be 75% of the total number of the plurality of temperature signals 62. In some embodiments, the predetermined number may be 70%, 60%, 50%, 40%, or 30% of the total number of the plurality of temperature signals 62. In some embodiments, the predetermined number may be a minimum number of validated temperature signals 64 required by the controller 55 to detect the burner failure in the gas turbine engine 10. In some embodiments, the predetermined number may be any number based on desired application attributes.

In some embodiments, when the plurality of validated temperature signals 64 is absent in a predetermined angular range 72 (shown in FIG. 3), the controller 55 may improve the temperature focus 65 such that the temperature focus 65 is within the tolerance range 66. In some embodiments, when the plurality of validated temperature signals 64 is absent in the predetermined angular range 72, the controller 55 may perform the at least one hazard protection action 90.

In some embodiments, the predetermined angular range 72 may be about 45 degrees, about 60 degrees, about 90 degrees, about 120 degrees, about 135 degrees, about 150 degrees, or about 180 degrees. In some embodiments, the predetermined angular range 72 may be based on the arrangement of the plurality of temperature sensors 60. In some embodiments, the predetermined angular range 72 may be based on the total number of the plurality of temperature sensors 60. In some embodiments, the predetermined angular range 72 may be any angular range based on desired application attributes.

In some embodiments, the controller 55 may determine a whole mean of the plurality of validated temperature signals 64. Specifically, the whole mean is an arithmetic mean of the plurality of validated temperature signals 64.

In some embodiments, the controller 55 may determine a subset of the plurality of validated temperature signals 64.

In some embodiments, the controller 55 may determine the subset of the plurality of validated temperature signals 64 by eliminating one or more of the plurality of validated temperature signals 64 having corresponding temperature values less than a low threshold from the whole mean. In some embodiments, the low threshold may be from about 10 Kelvin (K) to about 100K from the whole mean. In some embodiments, the low threshold may from about 30K to about 50K from the whole mean. In some embodiments, the low threshold may be any threshold temperature based on desired application attributes.

Therefore, the controller 55 may screen out low outliers among the temperature values. Further, if a burner 50 is blocked then the corresponding temperature value will be a low outlier and will be eliminated. Thus, the focused mean will be higher than the whole mean. The controller 55 may therefore work with a variable number of validated temperature signals 64, with one or more being eliminated and restored as the validated temperature signals 64 may vary. The controller 55 may also work with some temperature sensors 60 having failed on a permanent basis.

In some embodiments, when a number of the plurality of validated temperature signals 64 remaining in the subset after eliminating the one or more of the plurality of validated temperature signals 64 having the corresponding temperature values less than the low threshold is less than a predetermined number, the controller 55 may improve the temperature focus 65 such that the temperature focus 65 is within the tolerance range 66 or perform the at least one hazard protection action 90. In some embodiments, the predetermined number may be 75% of the total number of the plurality of temperature signals 62. In some embodiments, the predetermined number may be 70%, 60%, 50%, 40%, or 30% of the total number of the plurality of temperature signals 62. In some embodiments, the predetermined number may be a minimum number of validated temperature signals 64 required by the controller 55 to detect the burner failure in the gas turbine engine 10. In some embodiments, the predetermined number may be any number based on desired application attributes.

In some embodiments, the controller 55 may further eliminate one or more of the plurality of validated temperature signals 64 having corresponding temperature values greater than a high threshold from the whole mean from the subset. In some embodiments, the high threshold may be from about 50K to about 200K from the whole mean. In some embodiments, the high threshold may from about 100K to about 150K from the whole mean. In some embodiments, the high threshold may be any threshold temperature from the whole mean based on desired application attributes.

Therefore, the controller 55 may further screen out high outliers among the temperature values. This may help to reduce occurrence of an inadvertent trip which, in turn, may trigger an alarm, or any other hazard protection action 90. Further, high temperatures owing to multiple blocked burners may cause turbine degradation, leading to High Energy Debris release and may be considered as potentially-hazardous.

In some embodiments, when a number of the plurality of validated temperature signals 64 remaining in the subset after eliminating the one or more of the plurality of validated temperature signals 64 having the corresponding temperature values greater than the high threshold is less than a predetermined number, the controller 55 may improve the temperature focus 65 such that the temperature focus 65 is within the tolerance range 66 or perform the at least one hazard protection action 90. In some embodiments, the predetermined number may be 75% of the total number of the plurality of temperature signals 62. In some embodiments, the predetermined number may be 70%, 60%, 50%, 40%, or 30% of the total number of the plurality of temperature signals 62. In some embodiments, the predetermined number may be a minimum number of validated temperature signals 64 required by the controller 55 to detect the burner failure in the gas turbine engine 10. In some embodiments, the predetermined number may be any number based on desired application attributes.

In some other embodiments, the controller 55 may compare each of the plurality of validated temperature signals 64 to a standard distribution. In some embodiments, the standard distribution is selected from at least one of Exponential distribution, Normal distribution, Lognormal distribution, Poisson distribution, and Weibull distribution.

In some embodiments, the controller 55 may determine the subset of the plurality of validated temperature signals 64 by eliminating one or more of the plurality of validated temperature signals 64 having corresponding temperature values below a standard deviation threshold from the whole mean. Further, the controller 55 may eliminate one or more of the plurality of validated temperature signals 64 having corresponding temperature values above the standard deviation threshold from the whole mean from the subset.

In some embodiments, the standard deviation threshold may be about 0.5 from the whole mean. In some embodiments, the standard deviation threshold may be about 1, 1.5, 2, 2.5, or 3 from the whole mean. In some embodiments, the standard deviation threshold may be based on desired application attributes.

Therefore, the controller 55 may also screen out the low and high outliers according to a shape of the standard distribution. The shape of the standard distribution may be determined and chosen based on historical data/tests.

In some other embodiments, when a number of the plurality of validated temperature signals 64 remaining in the subset is less than a predetermined number, the controller 55 may improve the temperature focus 65 such that the temperature focus 65 is within the tolerance range 66 or perform the at least one hazard protection action 90. In some embodiments, the predetermined number may be 75% of the total number of the plurality of temperature signals 62. In some embodiments, the predetermined number may be 70%, 60%, 50%, 40%, or 30% of the total number of the plurality of temperature signals 62. In some embodiments, the predetermined number may be a minimum number of validated temperature signals 64 required by the controller 55 to detect the burner failure in the gas turbine engine 10. In some embodiments, the predetermined number may be any number based on desired application attributes.

Therefore, when the number of the plurality of validated temperature signals 64 is insufficient or the number of the plurality of validated temperature signals 64 that are not outliers is insufficient, the controller may improve the temperature focus 65 such that the temperature focus 65 is within the tolerance range 66 or perform the at least one hazard protection action 90. In some cases, there may be a potential for the controller 55 to prevent the dispatch of the aircraft or prohibit restarting the gas turbine engine 10 in a land-based or marine application. In some cases, upon detecting the anomaly, further operation may be determined by evaluating risk to the gas turbine engine 10 from the detected anomaly. Further, this may also allow dispatchability with a number of faults sufficient to provide planned maintenance, such as when the aircraft visits a main base or when a power plant or oil & gas platform is shut down for long-term maintenance.

In some embodiments, the controller 55 may further determine a focused mean of the subset. Specifically, the focused mean is an arithmetic mean of the plurality of validated temperature signals 64 remaining in the subset.

In some embodiments, the controller 55 may determine the temperature focus 65 as a difference between the focused mean and the whole mean.

Figure 5:
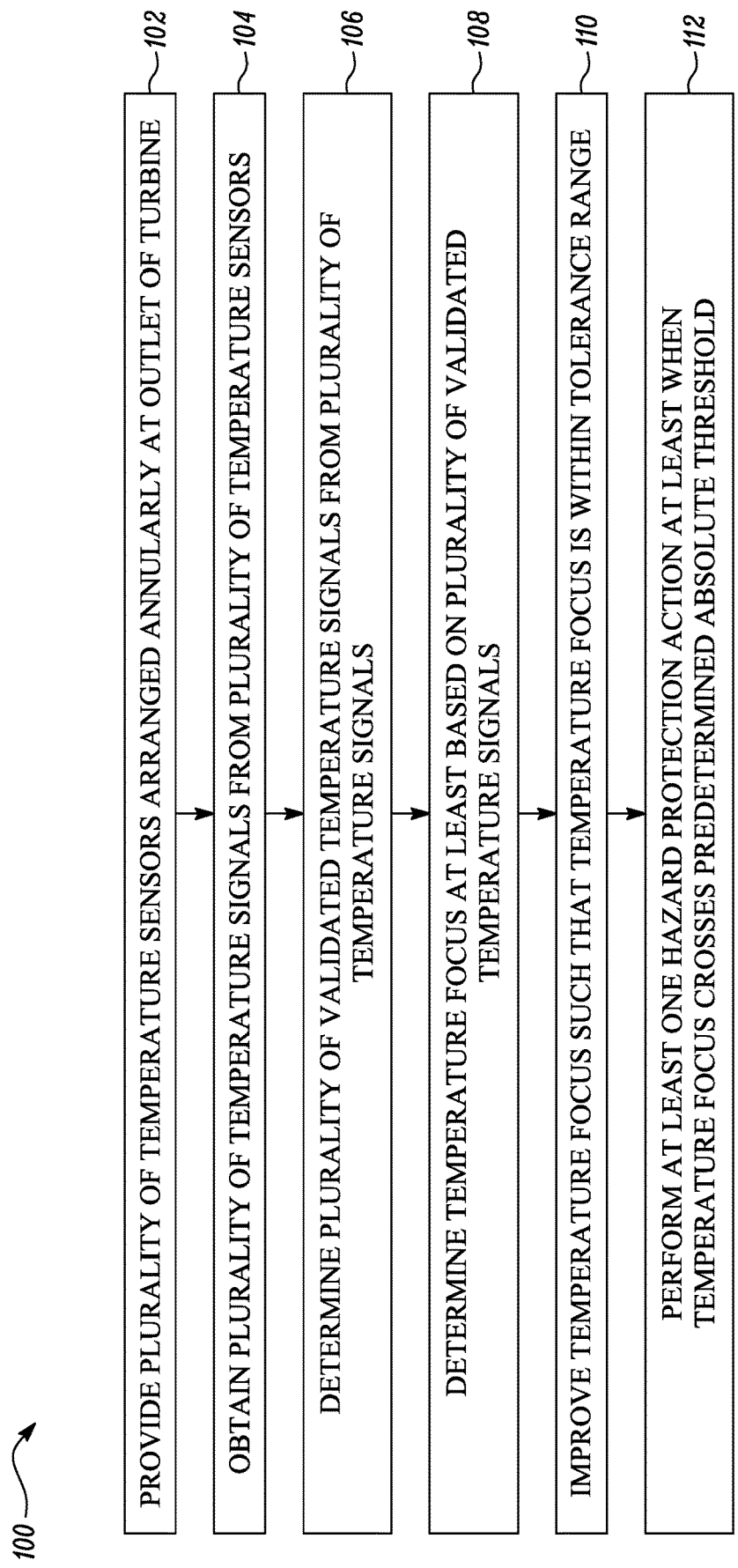
FIG. 5 is a flowchart for a method for detecting a burner failure in a gas turbine engine in accordance with an embodiment of the present disclosure.

FIG. 5 illustrates a flow chart for a method 100 for detecting the burner failure in the gas turbine engine 10 (shown in FIG. 1) in accordance with an embodiment of the present disclosure. The method 100 will be described with reference to FIGS. 1 to 4B.

At step 102, the method 100 includes providing the plurality of temperature sensors 60 arranged annularly at the outlet 45 of the turbine 40. As discussed above, the plurality of temperature sensors 60 has respective temperature ranges 63. Further, as discussed above, in some embodiments, the gas turbine engine 10 further includes the final stage turbine 42 disposed downstream of the turbine 40. In some embodiments, step 102 includes providing the plurality of temperature sensors 60 upstream of the final stage turbine 42. In other words, providing the plurality of temperature sensors 60 arranged annularly at the outlet 45 of the turbine 40 includes providing the plurality of temperature sensors 60 upstream of the final stage turbine 42.

At step 104, the method 100 includes obtaining the plurality of temperature signals 62 from the plurality of temperature sensors 60.

At step 106, the method 100 includes determining the plurality of validated temperature signals 64 from the plurality of temperature signals 62. The plurality of validated temperature signals 64 is within the respective temperature ranges 63 of the respective temperature sensors 60.

In some embodiments, the method 100 may include determining the staging state of the gas turbine engine 10. The staging state of the gas turbine engine 10 may be determined so that the burner failure condition is not confused with the normal operation condition of the turbine system during which the one or more burners 50 may be purposely inactive.

At step 108, the method 100 includes determining the temperature focus 65 at least based on the plurality of validated temperature signals 64.

At step 110, the method 100 includes improving the temperature focus 65 such that the temperature focus 65 is within the tolerance range 66.

In some embodiments, step 110 includes transmitting the command 92 to the fuel staging control system 80 to increase the fuel flow to at least one burner 50 from the plurality of burners 50. In other words, in some embodiments, improving the temperature focus 65 such that the temperature focus 65 is within the tolerance range 66 includes transmitting the command 92 to the fuel staging control system 80 to increase the fuel flow to at least one burner 50 from the plurality of burners 50.

At step 112, the method 100 includes performing the at least one hazard protection action 90 at least when the temperature focus 65 crosses the predetermined threshold 68. In some embodiments, step 112 includes transmitting the warning 94 to the cockpit of the aircraft powered by the gas turbine engine 10. In other words, in some embodiments, performing the at least one hazard protection action 90 at least when the temperature focus 65 crosses the predetermined threshold 68 includes transmitting the warning 94 to the cockpit of the aircraft powered by the gas turbine engine 10.

In some embodiments, step 112 includes transmitting the command 92 to reduce the fuel flow to the lower point within the operating range. In other words, in some embodiments, performing the at least one hazard protection action 90 at least when the temperature focus 65 crosses the predetermined threshold 68 includes transmitting the command 92 to reduce the fuel flow to the lower point within the operating range.

In some embodiments, step 112 includes transmitting the command 92 to shut down the gas turbine engine 10. In other words, in some embodiments, performing the at least one hazard protection action 90 at least when the temperature focus 65 crosses the predetermined threshold 68 includes transmitting the command 92 to shut down the gas turbine engine 10.

In some embodiments, steps 104, 106, 108, and 110 are cyclically repeated in time. In some embodiments, the method 100 proceeds to at least one of steps 110 and 112 when the temperature focus 65 is outside the tolerance range 66 for a predefined number of consecutive cycles.

Therefore, if the temperature focus 65 is outside the tolerance range 66 for the predefined number of consecutive cycles, the method 100 may detect an anomaly and may either improve the temperature focus 65 or perform the at least one hazard protection action 90.

The method 100 of the present disclosure may eliminate invalid signals. Further, the method 100 is not solely based upon comparison of the plurality of individual temperature signals 62 with a mean. Further, the method 100 may be simple and may not require determining a temperature spread and/or step(s) for detecting location(s) 70 of the burner failure. The detection of the location(s) 70 of the burner failure may not be necessary for hazard protection. Thus, the method 100 may be robust, simple to implement, and quicker to execute.

Figure 6:
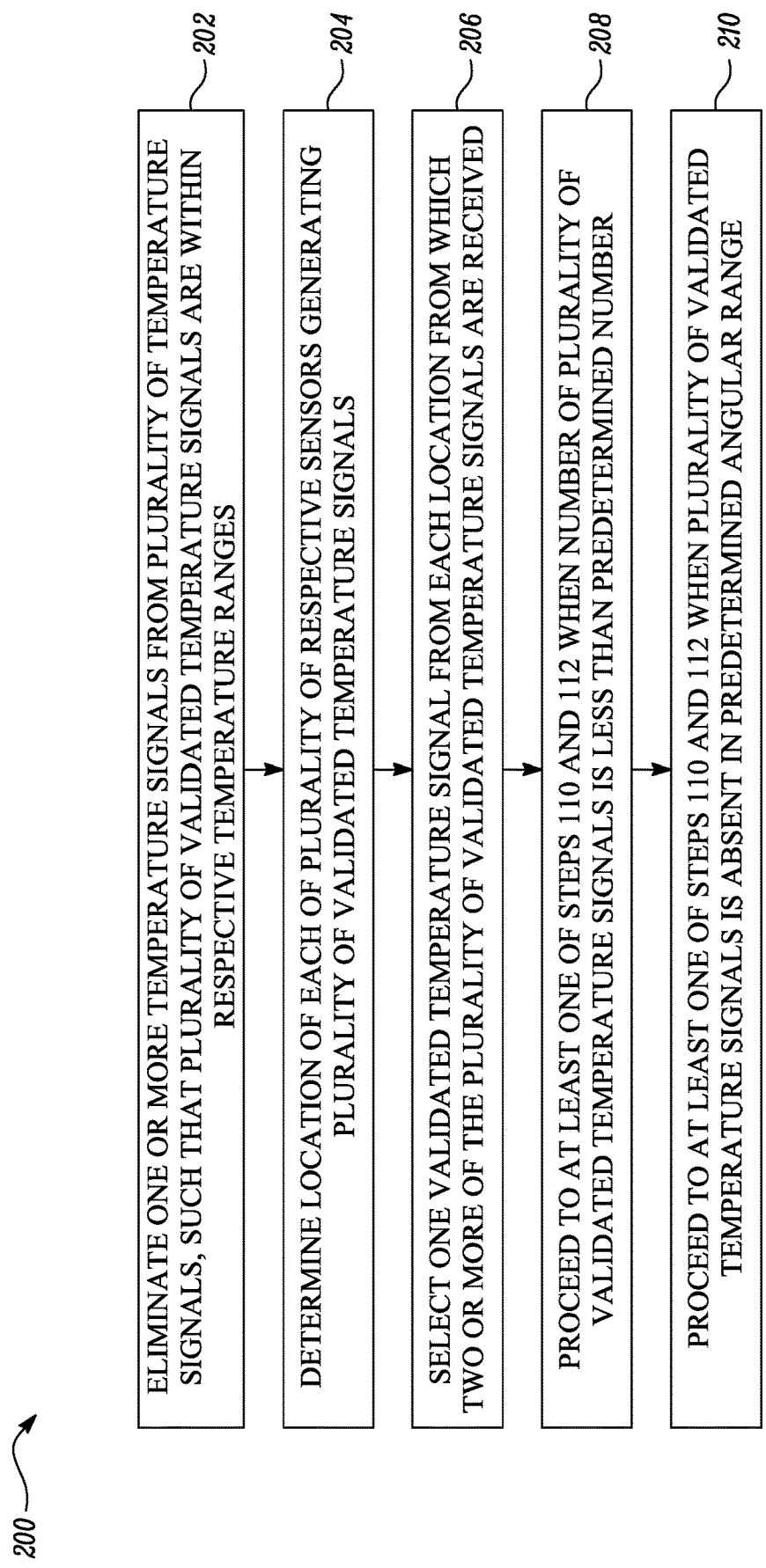
FIG. 6 is a flow chart for a method for determining a plurality of validated temperature signals in accordance with an embodiment of the present disclosure.

FIG. 6 illustrates a flow chart for a method 200 for determining the plurality of validated temperature signals 64 from the plurality of temperature signals 62 in accordance with an embodiment of the present disclosure. In other words, FIG. 6 illustrates the flow chart for the method 200 including sub-steps for step 106 of the method 100, according to an embodiment of the present disclosure.

Referring to FIGS. 5 and 6, at sub-step 202, the method 200 includes eliminating the one or more temperature signals 62 from the plurality of temperature signals 62 to determine the plurality of validated temperature signals 64, such that the plurality of validated temperature signals 64 are within the respective temperature ranges 63 of the respective temperature sensors 60.

At sub-step 204, the method 200 includes determining the location 70 of each of the plurality of respective sensors 60 generating the plurality of validated temperature signals 64.

At sub-step 206, the method 200 includes selecting the one validated temperature signal 64 from each location 70 from which two or more of the plurality of validated temperature signals 64 are received. In some embodiments, the selection is based on at least one of the channel based selection, the temperature value based selection, the mean based selection, and the model based selection.

At sub-step 208, the method 200 includes proceeding to at least one of steps 110 and 112 when the number of the plurality of validated temperature signals 64 is less than the predetermined number.

At sub-step 210, the method 200 includes proceeding to at least one of steps 110 and 112 when the plurality of validated temperature signals 64 is absent in the predetermined angular range 72.

Figure 7:
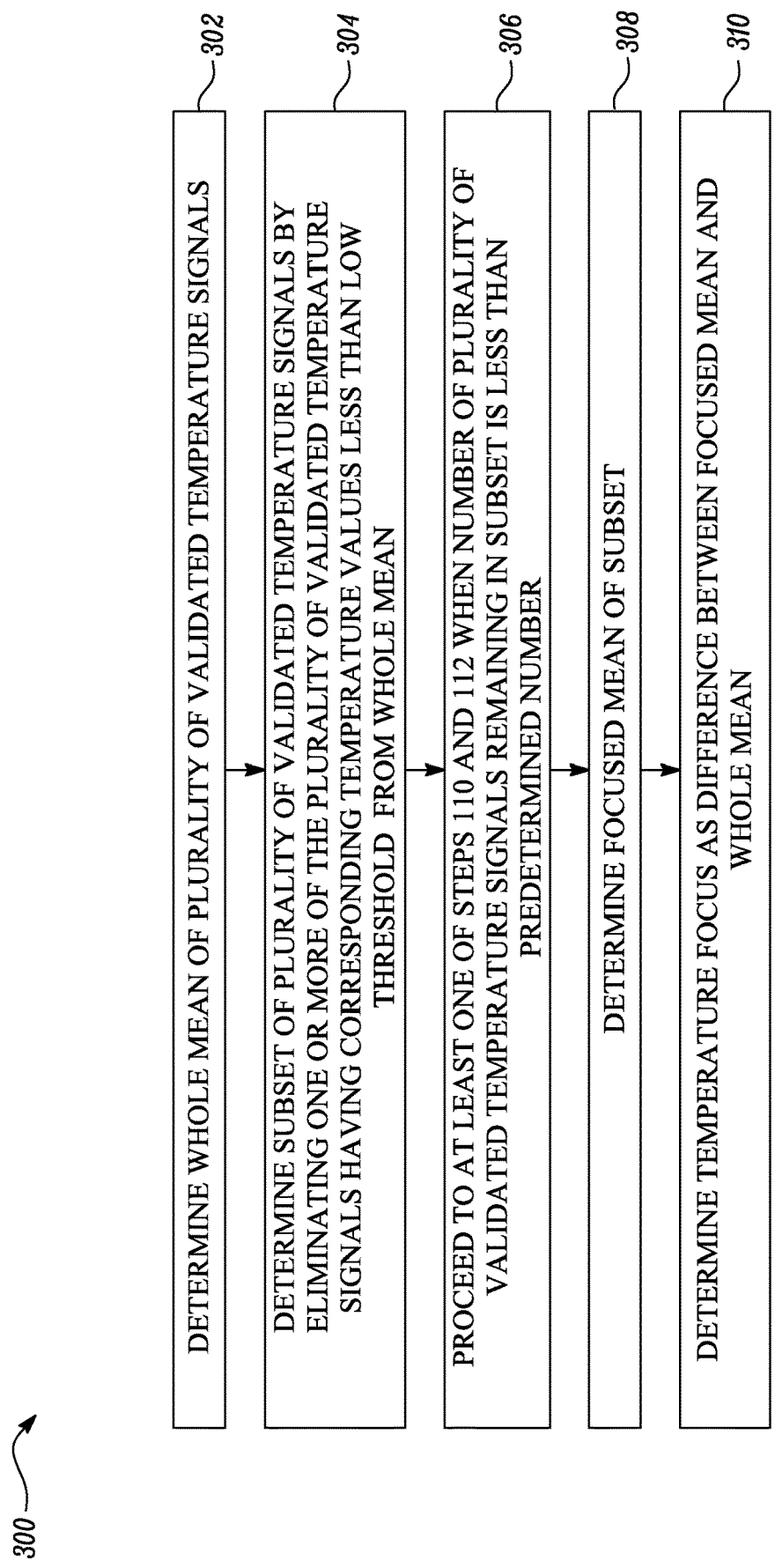
FIG. 7 is a flow chart for a method for determining the temperature focus in accordance with an embodiment of the present disclosure.

FIG. 7 illustrates a flow chart for a method 300 for determining the temperature focus 65 at least based on the plurality of validated temperature signals 64 in accordance with an embodiment of the present disclosure. In other words, FIG. 7 illustrates the flow chart for the method 300 including sub-steps for step 108 of the method 100, according to an embodiment of the present disclosure.

Referring to FIGS. 5 and 7, at sub-step 302, the method 300 includes determining the whole mean of the plurality of validated temperature signals 64.

At sub-step 304, the method 300 includes determining the subset of the plurality of validated temperature signals 64 by eliminating the one or more of the plurality of validated temperature signals 64 having corresponding temperature values less than the low threshold from the whole mean.

At sub-step 306, the method 300 includes proceeding to at least one of steps 110 and 112 when the number of the plurality of validated temperature signals 64 remaining in the subset is less than the predetermined number. Specifically, in some embodiments, the sub-step 306 includes proceeding to at least one of steps 110 and 112 when the number of the plurality of validated temperature signals 64 remaining in the subset after eliminating the one or more of the plurality of validated temperature signals 64 having the corresponding temperature values less than the low threshold is less than the predetermined number.

At sub-step 308, the method 300 includes determining the focused mean of the subset.

At sub-step 310, the method 300 includes determining the temperature focus 65 as the difference between the focused mean and the whole mean.

Figure 8:
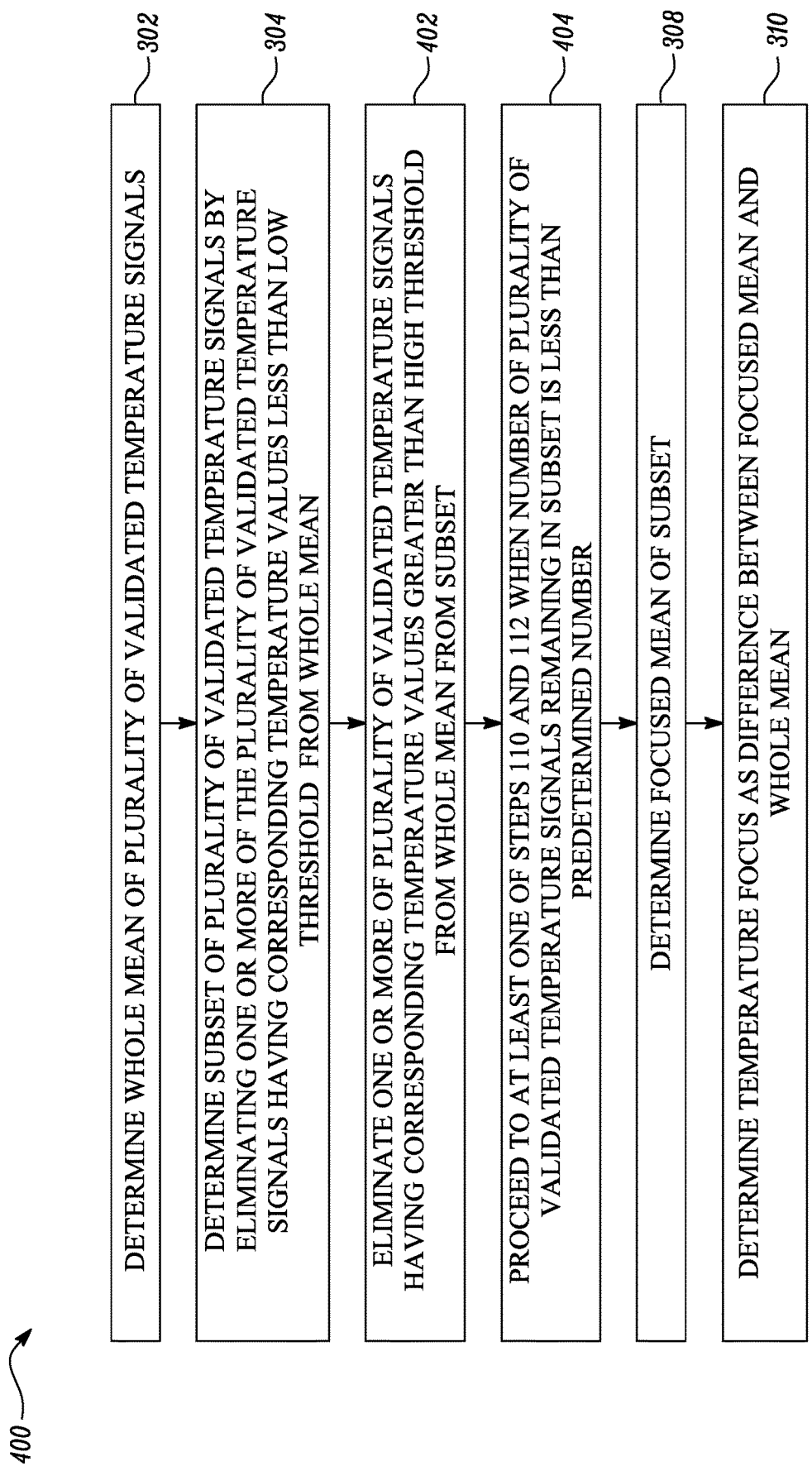
FIG. 8 is a flow chart for a method for determining the temperature focus in accordance with another embodiment of the present disclosure.

FIG. 8 illustrates a flow chart for a method 400 for determining the temperature focus 65 at least based on the plurality of validated temperature signals 64 in accordance with another embodiment of the present disclosure.

The method 400 is substantially similar to the method 300 shown in FIG. 7. However, the method 400 includes an additional sub-step 402 of eliminating the one or more of the plurality of validated temperature signals 64 having corresponding temperature values greater than the high threshold from the whole mean from the subset. Further, the method 400 includes sub-step 404 instead of sub-step 306.

At sub-step 404, the method 400 includes proceeding to at least one of steps 110 and 112 when the number of the plurality of validated temperature signals 64 remaining in the subset is less than the predetermined number. Specifically, in some embodiments, the sub-step 404 includes proceeding to at least one of steps 110 and 112 when the number of the plurality of validated temperature signals 64 remaining in the subset after eliminating the one or more of the plurality of validated temperature signals 64 having the corresponding temperature values greater than the high threshold is less than the predetermined number.

FIG. 9 illustrates a flow chart for a method 500 for determining the temperature focus 65 at least based on the plurality of validated temperature signals 64 in accordance with another embodiment of the present disclosure.

At sub-step 502, the method 500 includes determining the whole mean of the plurality of validated temperature signals 64.

At sub-step 504, the method 500 includes comparing each of the plurality of validated temperature signals 64 to the standard distribution. As discussed above, in some embodiments, the standard distribution is selected from at least one of Exponential distribution, Normal distribution, Lognormal distribution, Poisson distribution, and Weibull distribution.

At sub-step 506, the method 500 includes determining the subset of the plurality of validated temperature signals 64 by eliminating the one or more of the plurality of validated temperature signals 64 having corresponding temperature values below the standard deviation threshold from the whole mean.

At sub-step 508, the method 500 includes eliminating the one or more of the plurality of validated temperature signals 64 having corresponding temperature values above the standard deviation threshold from the whole mean from the subset.

At sub-step 510, the method 500 includes proceeding to at least one of steps 110 and 112 when the number of the plurality of validated temperature signals 64 remaining in the subset is less than the predetermined number.

At sub-step 512, the method 500 includes determining the focused mean of the subset.

At sub-step 514, the method 500 includes determining the temperature focus 65 as the difference between the focused mean and the whole mean.

Therefore, the method 100 of the present disclosure may prevent tripping any alarm or shutdown criterion on the basis of a single temperature signal (e.g., the temperature signal 62). The method 100 may help to determine an anomaly, for example, whether a condition would become potentially-hazardous within a current flight, further performing the at least one hazard protection action 90 at least when the condition would become potentially-hazardous.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method for detecting a burner failure in a gas turbine engine having a combustor and a turbine disposed downstream of the combustor, the combustor having a plurality of burners arranged annularly, the method comprising the steps of:
   A) providing a plurality of temperature sensors arranged annularly at an outlet of the turbine, the plurality of temperature sensors having respective temperature ranges;
   B) obtaining a plurality of temperature signals from the plurality of temperature sensors;
   C) determining a plurality of validated temperature signals from the plurality of temperature signals, wherein the plurality of validated temperature signals is within the respective temperature ranges of the respective temperature sensors;
   D) determining a temperature focus at least based on the plurality of validated temperature signals;
   E) improving the temperature focus such that the temperature focus is within a tolerance range; and
   F) performing at least one hazard protection action at least when the temperature focus crosses a predetermined threshold;
   wherein step C) comprises the sub-steps of:
   C1) eliminating one or more temperature signals from the plurality of temperature signals to determine the plurality of validated temperature signals, such that the plurality of validated temperature signals is within respective temperature ranges of the respective temperature sensors;
   C2) determining a location of each of the plurality of respective sensors generating the plurality of validated temperature signals; and
   C3) selecting one validated temperature signal from each location from which two or more of the plurality of validated temperature signals are received, wherein the selection is based on at least one of a channel based selection, a temperature value based selection, a mean based selection, and a model based selection.

2. The method of claim 1, wherein steps B), C), D), and E) are cyclically repeated in time, and wherein the method proceeds to at least one of steps E) and F) when the temperature focus is outside the tolerance range for a predefined number of consecutive cycles.

3. The method of claim 1, wherein the method proceeds to at least one of steps E) and F) when a number of the plurality of validated temperature signals is less than a predetermined number.

4. The method of claim 1, wherein the method proceeds to at least one of steps E) and F) when the plurality of validated temperature signals is absent in a predetermined angular range.

5. The method of claim 1, wherein step E) comprises transmitting a command to a fuel staging control system to increase a fuel flow to at least one burner from the plurality of burners.

6. The method of claim 1, wherein step F) comprises transmitting a warning to a cockpit of an aircraft powered by the gas turbine engine.

7. The method of claim 1, wherein step F) further comprises transmitting a command to reduce the fuel flow to a lower point within an operating range of the gas turbine engine.

8. The method of claim 1, wherein step F) further comprises transmitting a command to shut down the gas turbine engine.

9. The method of claim 1, wherein the gas turbine engine further comprises a final stage turbine disposed downstream of the turbine, and wherein step A) comprises providing the plurality of temperature sensors upstream of the final stage turbine.

10. A method for detecting a burner failure in a gas turbine engine having a combustor and a turbine disposed downstream of the combustor, the combustor having a plurality of burners arranged annularly, the method comprising the steps of:
   A) providing a plurality of temperature sensors arranged annularly at an outlet of the turbine, the plurality of temperature sensors having respective temperature ranges;
   B) obtaining a plurality of temperature signals from the plurality of temperature sensors;
   C) determining a plurality of validated temperature signals from the plurality of temperature signals, wherein the plurality of validated temperature signals is within the respective temperature ranges of the respective temperature sensors;
   D) determining a temperature focus at least based on the plurality of validated temperature signals;
   E) improving the temperature focus such that the temperature focus is within a tolerance range; and
   F) performing at least one hazard protection action at least when the temperature focus crosses a predetermined threshold;
   wherein step D) comprises the sub-steps of:
      D1) determining a whole mean of the plurality of validated temperature signals;
      D2) determining a subset of the plurality of validated temperature signals by eliminating one or more of the plurality of validated temperature signals having corresponding temperature values less than a low threshold from the whole mean;
      D3) determining a focused mean of the subset; and
      D4) determining the temperature focus as a difference between the focused mean and the whole mean.

11. The method of claim 10, wherein step D2) further comprises the sub-step of: D2a) eliminating one or more of the plurality of validated temperature signals having corresponding temperature values greater than a high threshold from the whole mean from the subset.

12. The method of claim 11, wherein the method proceeds to at least one of steps E) and F) when a number of the plurality of validated temperature signals remaining in the subset after eliminating the one or more of the plurality of validated temperature signals having the corresponding temperature values greater than the high threshold is less than a predetermined number.

13. The method of claim 10, wherein the method proceeds at least one of steps E) and F) when a number of the plurality of validated temperature signals remaining in the subset after eliminating the one or more of the plurality of validated temperature signals having the corresponding temperature values less than the low threshold is less than a predetermined number.

14. The method of claim 10, wherein the method proceeds to at least one of steps E) and F) when a number of the plurality of validated temperature signals is less than a predetermined number.

15. The method of claim 10, wherein the method proceeds to at least one of steps E) and F) when the plurality of validated temperature signals is absent in a predetermined angular range.

16. A method for detecting a burner failure in a gas turbine engine having a combustor and a turbine disposed downstream of the combustor, the combustor having a plurality of burners arranged annularly, the method comprising the steps of:
   A) providing a plurality of temperature sensors arranged annularly at an outlet of the turbine, the plurality of temperature sensors having respective temperature ranges;
   B) obtaining a plurality of temperature signals from the plurality of temperature sensors;
   C) determining a plurality of validated temperature signals from the plurality of temperature signals, wherein the plurality of validated temperature signals is within the respective temperature ranges of the respective temperature sensors;
   D) determining a temperature focus at least based on the plurality of validated temperature signals;
   E) improving the temperature focus such that the temperature focus is within a tolerance range; and
   F) performing at least one hazard protection action at least when the temperature focus crosses a predetermined threshold;
   wherein step D) comprises the sub-steps of:
      D1) determining a whole mean of the plurality of validated temperature signals;
      D2) comparing each of the plurality of validated temperature signals to a standard distribution;
      D3) determining a subset of the plurality of validated temperature signals by eliminating one or more of the plurality of validated temperature signals having corresponding temperature values below a standard deviation threshold from the whole mean;
      D4) eliminating one or more of the plurality of validated temperature signals having corresponding temperature values above the standard deviation threshold from the whole mean from the subset;
      D5) determining a focused mean of the subset; and
      D6) determining the temperature focus as a difference between the focused mean and the whole mean.

17. The method of claim 16, wherein the standard distribution is selected from at least one of Exponential distribution, Normal distribution, Lognormal distribution, Poisson distribution, and Weibull distribution.

18. The method of claim 16, wherein the method proceeds to at least one of steps E) and F) when a number of the plurality of validated temperature signals remaining in the subset is less than a predetermined number.

19. The method of claim 16, wherein the method proceeds to at least one of steps E) and F) when a number of the plurality of validated temperature signals is less than a predetermined number.

20. The method of claim 16, wherein the method proceeds to at least one of steps E) and F) when the plurality of validated temperature signals is absent in a predetermined angular range.

* * * * *